United States Patent [19]

Nyman et al.

[11] 4,327,048

[45] Apr. 27, 1982

[54] HIGH DENSITY INFORMATION DISC PROCESSING

[75] Inventors: Frederick R. Nyman, Carmel; Barry Stevens; James A. Calamari, Jr., both of Indianapolis, all of Ind.

[73] Assignee: RCA Corporation, New York, N.Y.

[21] Appl. No.: 224,905

[22] Filed: Jan. 14, 1981

[51] Int. Cl.$^3$ .............................................. B29D 17/00
[52] U.S. Cl. ..................................... 264/107; 15/302; 264/130; 264/233; 425/810
[58] Field of Search ...................... 264/107, 233, 130; 425/810; 15/302

[56] References Cited

U.S. PATENT DOCUMENTS 3,842,194 10/1974 Clemens ........................... 178/66 A Primary Examiner—Thomas P. Pavelko
Attorney, Agent, or Firm—Birgit E. Morris

[57] ABSTRACT

High density information discs that have been compression molded from a conductive carbon-containing polyvinylchloride molding composition are cleaned with a water based solution to remove water soluble salts from the surface of the disc, followed by a high temperature aqueous wash wherein the temperature is from about 110° to about 130° F. These discs have improved environmental stability.

16 Claims, No Drawings

HIGH DENSITY INFORMATION DISC PROCESSING

This invention relates to the manufacture of high density information discs. More particularly, this invention relates to the manufacture of such discs to improve their storage stability.

BACKGROUND OF THE INVENTION

A capacitance video disc system has been described by Clemens in U.S. Pat. No. 3,842,194. The disc described comprises a plastic disc containing an information track having audio, video and color information in the form of a surface relief pattern arranged in the surface of the disc which can be played back with a stylus. The video disc of Clemens had a conductive metal coating to provide the conductivity required for capacitive pickup and a thin layer of a dielectric material thereover. An electrode on the playback stylus completed the capacitor.

Improvements have been made in this system whereby the disc is made from a conductive plastic material, as disclosed by Fox et al. in copending application Ser. No. 105,550 filed Dec. 20, 1979, which is a continuation of application Ser. No. 818,279 filed July 25, 1977, now abandoned. A polyvinylchloride based molding composition is mixed with sufficient amounts of finely divided carbon black particles so that the resulting composition has the conductivity required for capacitive playback. A thin layer of the polyvinylchloride surrounds each of the conductive carbon particles so that a thin dielectric layer is present at the surface.

The use of a conductive plastic eliminates the need for separate metal and dielectric layers on the disc surface and thus has simplified manufacture of the disc. However, we have found the stability of these discs with respect to environmental fluctuations of temperature and relative humidity has been less than satisfactory. Discs which on initial playback have excellent playback characteristics deteriorate with respect to playback after storage under ambient conditions. This deterioration is particularly marked when the discs are exposed to high temperature and/or high relative humidity conditions.

Huck et al. in a copending application Ser. No. 091,878 filed Nov. 7, 1979 and entitled "VIDEO DISC PROCESSING," have disclosed that video discs that have been cleaned by washing or spraying with an aqueous solution have improved stability. This copending application is incorporated herein by reference. The preferred solution is one made up of a 5 percent solution of a mixture of organic alcohols commercially available as 1160B Conditioner from the Shipley Company which contains as its principal ingredients about 96.2 mol percent of Lubrol, which has the formula

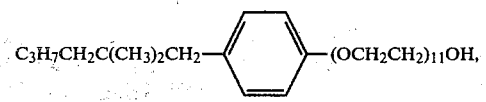

about 3.8 mol percent of 1,2-propanediol and a minor amount of triisopropanol amine. The discs are sprayed or immersed in this solution and thereafter rinsed with water to remove the conditioner.

Over time, additional materials appear to come to the surface of the video disc, and the above cleaning procedure has been found to be less than satisfactory insofar as long term stability after exposure to high temperature and high relative humidity is concerned. Thus an improved cleaning process has been sought to reduce this problem, which has been referred to as carrier distress.

SUMMARY OF THE INVENTION

We have found an improved process for cleaning the surface of molded, conductive, high density information discs whereby the discs are sprayed with a hot water rinse in conjunction with cleaning operations that remove surface materials that contribute to high carrier distress.

DETAILED DESCRIPTION OF THE INVENTION

The high density information discs treated according to the present invention are molded from a molding composition comprising a polymer of vinyl chloride, finely divided carbon black particles, a stabilizing system that is generally a mixture of tin salts that scavange or take up hydrochloric acid formed as a decomposition product of the vinylchloride polymer during processing, a lubricant system, generally composed of both an internal lubricant to modify the melt viscosity of the molding composition during processing and an external lubricant to provide release of the molded article, herein described as a video disc, from the mold, and a flow modifier system that is composed of plasticizers and processing aids to reduce the melt viscosity of the molding composition during processing.

When large amounts of carbon black are present in the molding composition, the melt viscosity greatly increases thereby necessitating higher molding temperatures or larger amounts of plasticizers and processing aids. Since the present carbon loaded polyvinylchloride molding compositions contain about 12 up to 20 percent by weight of carbon black or even higher amounts, depending upon the type of carbon black used and the dispersion obtainable, several processing aids and plasticizers must be added to obtain the melt flow properties required to compression mold the information disc which has the information as a very small surface relief pattern in a very shallow information track. Also, sufficient lubricants must be added to promote ready release of the molded article from the mold to prevent distortion of the record or of the stamper from which it is molded.

During compression molding of the present high density information disc, many of the above additives or reaction products of these additives, including decomposition products or reaction products of the additives with the PVC or with each other, migrate to the surface of the disc where they form a thin film. This thin film is a complex mixture of various organic and inorganic materials. It is this thin film which is moisture sensitive and causes playback problems for the disc.

When an information disc is molded and exposed to moisture in the atmosphere, small droplets of water condense on the surface of the disc. Any salts or other water soluble materials that are present on the surface of the disc are dissolved by the water droplets. These water droplets also dissolve water soluble materials below the surface of the disc as by a wicking or leaching effect. When the water evaporates the salts are left on the surface of the disc, now not as a uniform thin film, but as lumps or deposits. These deposits may be many grooves wide and they fill up the grooves beneath them as well. Thus the information present in the groove beneath the deposits is masked or lost during playback of the stylus which rides over the deposits, resulting in a loss of signal or dropouts; or because the stylus may dislodge some of these deposits during playback which then collect beneath or in front of the stylus and result in further distortion or loss of signal or even dislodgment of the stylus from the signal track. The present standard for such loss of signal, or dropouts, for acceptable video discs is about 2–3 seconds in one hour of playback time.

By washing the discs with an aqueous cleaning solution, which can be deionized water, a dilute solution of an acid or an organic alcohol solution, the thin film of salts or other impurities is removed, whether by physical dislocation or dissolution, thereby greatly reducing the moisture sensitivity of the disc.

The discs can be cleaned by immersing in the cleaning solution or by spraying and the like. A mechanical stirring or ultrasonic agitation can also aid the cleaning action. Multiple immersion can be employed and a final rinse with purified water will also be beneficially employed. After cleaning, the discs may be air dried or may be dried according to the method disclosed by Nyman et al. in copending application Ser. No. 165,977 filed July 7, 1980 and also herein incorporated by reference. This method involves a fluorocarbon drying cycle.

In conjunction with this cleaning method, the present invention includes a rinse with water at an elevated temperature. Preferably the discs will be sprayed with hot water immediately after cleaning with an aqueous solution such as the Shipley 1160B treatment. However, washing with hot water immediately prior to an aqueous solution cleaning can also be effective to reduce carrier distress.

The temperature of the water of the hot water wash that will be effective is at least about 110° F. up to about 130° F. (43°–54° C.). Lower temperatures are comparatively ineffective to reduce carrier distress and higher temperatures may result in physical distortion or softening of the surface of the disc. The water must be comparatively pure, i.e., have a resistivity of about 10–18 megohm-centimeter. This can be done by treatment of the water in conventional deionization equipment.

The polyvinylchloride (PVC) resins suitable for manufacture of the video disc include polymers and copolymers of vinylchloride and mixtures thereof. In order to produce desired characteristics in the molded video discs, such as dimensional stability, the PVC resin should have a high heat distortion temperature, preferably 140° F. (60° C.) or higher. Suitable polymers include homopolymers of vinylchloride such as No. 346 resin of the B. F. Goodrich Company which has a $T_g$ of 88° C., or a vinylchloride-polypropylene copolymer known as AP480 from Air Products and Chemicals, Inc., which has a $T_g$ of 76° C. Other polyvinylchloride homopolymers such as Great American Chemical Company's 550 resin and Air Product's 2160 resin can also be employed.

Conductive particles suitable for use in the molding composition include highly electrically conductive, finely divided carbon blacks, preferably which have a low bulk density to reduce loading requirements. Presently preferred is a product of the Armak Company, Ketjenblack EC, which has an apparent bulk density of about 140–160 grams per liter and an average particle size of about 300 angstroms. Other carbon blacks can also be employed, in whole or in part, provided they meet the electrical requirements. Denser particles of carbon will generally require higher loading, e.g., up to about 35–40 percent by weight of the molding composition, to obtain an equivalent electrical conductivity. An amount of from about 12–20 percent by weight of a carbon black such as Ketjenblack EC is preferred.

From about 1.5–4 percent by weight of stabilizers are added to the chosen PVC-carbon black composition. Suitable stabilizers include organotin compounds such as dibutyltin-$\beta$-mercaptopropionate, commercially available as T-35 from M and T Chemical Company, Inc., dibutyltin maleate, commercially available as Mark 275 from Argus Chemical Company, and stabilizers such as barium-cadmium-lead stearate, commercially available as Q-232B of Argus Chemical Company. Other stabilizers are well known. Stabilizers act primarily to scavenge volatile decomposition products of the PVC resin, particularly hydrogen chloride. Preferably, a combination of more than one stabilizer in a particular molding composition is employed.

Suitable lubricants for PVC resins are well known and include fatty acids and esters of alcohols and fatty acids, soaps, fatty acid amides and the like. At least two lubricants should be employed, again, to prevent excessive bleed out of the lubricant during the molding process and to provide both internal and external lubrication. Suitable lubricants include a mixture of a mono-fatty acid ester of varying molecular weight alcohols and acids commercially available as Loxiol's G-30 from Henkel International GmbH, Loxiol G-70, a polyfunctional complex ester of saturated fatty acids; a room temperature solid esterified montan wax commercially available as Wax E of the Hoechst Company; calcium, zinc or lead stearates; stearic amide; oleamide; ethylene bis stearamides and the like. Sufficient lubricants must be added to prevent high shear heating during processing and to provide good release from the mold. Generally from about 1 to 3 percent by weight of the molding composition of a lubricant system will be used.

Additional modifiers including plasticizers and processing aids in amounts up to about 10 percent by weight of the resin composition are also added to improve the processing and molding characteristics of the resin composition. Suitable plasticizers include products such as chlorinated paraffin waxes, for example Unichlor 70 AX from Neville Chemical Company, glyceryl tribenzoate, commercially available as Benzoflex S-404 from Velsichol Chemical Corporation, epoxidized soybean oils, commercially available as Paraflex G-62 from Rohm and Haas Company, Santicizer 711, a primary phthalate plasticizer of the Monsanto Company, Kodaflex NP10, a polymeric ester plasticizer from Eastman Chemical Products, dicyclohexylphthalate and various processing aids such as acrylic modifiers of Rohm and Haas Company commercially available as K-147 and K-175. Other modifiers are well known.

Video disc replicas are made by mixing the molding composition first as a dry blend and then heating to melt temperatures and extruding and pelletizing for storage. The discs are then compression molded in conventional manner, e.g., forming a pre-form and compression molding using a 30–60 second cycle at about 325°–380° F. (163°–190° C.) and removing the flashing.

A thin lubricant coating is usually added to the video disc. This film serves as an added dielectric layer at the surface and also serves to reduce stylus wear during playback of the disc. One lubricant type that has been employed successfully is a methylalkylsiloxane of the formula

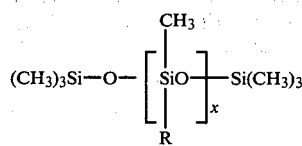

wherein R is an alkyl group of 4–20 carbon atoms and x is an integer. These lubricants can be applied by spinning or spraying from solution or evaporating onto the disc surface. An improved lubricant is a purified fractionated lubricant of the above type wherein R is decyl and x ranges from about 2–3. The purified lubricant can be made by molecular distillation of the higher molecular weight material, as is described by Wang et al. in copending application Ser. No. 937,819 filed Aug. 29, 1978 now abandoned, also herein incorporated by reference.

We believe the above described thermal treatment of high density information discs improves the effectiveness of removing debris from the surface of the discs although the mechanism of this removal, whether mechanical or chemical in nature, is not known. However, the improved effectiveness is evident from the improved results obtained, i.e., reduced carrier distress after exposure of the discs to high temperature and high relative humidity. It may be that the high temperature of the water treatment somehow passivates the disc surface, or that faster migration to the disc surface of impurities occurs, so that they can be removed during the remainder of the standard cleaning cycle.

The invention will be further described in the following Examples but it is to be understood that the invention is not meant to be limited to the details described therein. In the Examples parts and percentages are by weight unless otherwise noted.

Carrier distress time is measured by adding the amount of time in seconds (but discounting intervals of less than 10 microseconds) when the r.f. output of the player arm is less than 150 millivolts peak to peak (reference to a 1 volt reference level) and the time when the r.f. output is above 8.6 megahertz or below 3.1 megahertz in frequency, indicating a defect. The present pass criterion for a video disc is a maximum of 3 seconds in 60 minutes of playback time.

EXAMPLE 1

A molding composition was prepared by mixing 78 parts of X346 resin; 13 parts of Ketjenblack EC; 1.5 parts of T-35 stabilizer, 2.0 parts of Acryloid K-147, 0.75 part of Acryloid K-175, 0.5 part of Loxiol G-30 lubricant, 0.25 part of Loxiol G-70 lubricant, 1.0 part of calcium stearate, 1.0 part of Mark 275 and 2.0 parts of diundecylphthalate.

Video discs were compression molded at about 360° F. (182.2° C.). Discs molded as above were variously treated and compared to a control group. The control group of discs were designated 1A etc., were washed by immersing in a tank containing a 5 percent solution of Shipley 1160B conditioner, then sprayed with water at room temperature and rinsed in three separate tanks of water connected in a cascade rinse system whereby the first tank overflows into tank two and the second tank overflows into tank three. The disc travels through tank three first, whereby the first tank remains the cleanest.

The discs were then dried in 1,1,2-dichloro-2,2,1-trifluoroethane according to the method of Nyman et al. referred to above.

The second group of discs, those designated 1B etc., were cleaned with Shipley 1160B conditioner, sprayed with water at a temperature of 130° F., and then rinsed and dried as above.

The third group of discs, those designated 1C etc., were treated by cleaning with Shipley 1160B conditioner, sprayed with water at 130° F. and rinsed in a sequence of three cascade rinses wherein tank three was maintained at a temperature of 130° F. The second and first tank were maintained at room temperature and these discs were fluorocarbon dried as above.

The results of playback data are summarized in Table 1 below, after exposure of the discs to a temperature chamber maintained at 100° F. and 95 percent relative humidity for 1 hour. Six discs were tested from each press run and 1A, 2A and the like represent separate press runs.

TABLE 1

| | Carrier Distress, secs./hour | | | |
|---|---|---|---|---|
| | Stress Test 1 | | Stress Test 2 | |
| Discs | Median | Range | Median | Range |
| 1A | 521.8 | 340–561 | | |
| 2A | 683.8 | 439–1023 | | |
| 3A | 521.8 | 340–561 | | |
| 4A | 682.6 | 509–1748 | | |
| 5A | 632.6 | 487–965 | | |
| 6A | 521.9 | 421–727 | | |
| 7A | 605.0 | 86–702 | | |
| Average | 595.6 | | | |
| 1B | 18.2 | 5.2–21.0 | 2.4 | 0.4–174 |
| 2B | 8.1 | 5.8–30.8 | 15.0 | 9.2–267 |
| 3B | 67.6 | 38.4–106 | 39.5 | 9.6–54 |
| 4B | 7.2 | 3.0–12.3 | 15.0 | 1.4–34.2 |
| 5B | 3.6 | 0.6–30.2 | 4.6 | 0.8–50.2 |
| 6B | 4.8 | 1.4–77.8 | 24.8 | 0.4–436 |
| 7B | 131.2 | 21.4–1120.2 | — | — |
| Average | 34.4 | | 16.9 | |
| 1C | 6.5 | 1.6–18.4 | 2.7 | 0.6–39 |
| 2C | 7.5 | 1.8–31.3 | 15.2 | 3.6–22.4 |
| 3C | 23.0 | 20–40 | 33 | 8.8–53 |
| 4C | 2.1 | 0.4–16 | 2.3 | 1.6–21 |
| 5C | 1.5 | 0.6–12.2 | 8.2 | 2.2–49.8 |
| 6C | 1.6 | 0.2–6.2 | 13 | 0.8–587.4 |
| 7C | 5.1 | 1.0–714.0 | 3.6 | 1.8–30 |
| Average | 6.7 | | 11.1 | |

It is apparent that a thermal aqueous treatment improved the long term stability of the above discs.

EXAMPLE 2

Video discs molded as in Example 1 for a single press run were variously treated and carrier distress compared. In the A group, the discs were cleaned with Shipley 1160B conditioner, rinsed with water in a series of three tanks with room temperature water and dried in a fluorocarbon. In the B group the discs were cleaned with Shipley 1160B conditioner, the discs were then sprayed for two minutes with water at 110° F. and then rinsed with water and dried as above. The C group was treated for two minutes at 130° F. and the D group treated for one minute at 130° F., all other steps being the same as for groups A and B. The results after stress condensations in a chamber held at 100° F. and 95 percent relative humidity are tabulated below.

TABLE 2

| Discs | Carrier Distress secs./hour | | | |
|---|---|---|---|---|
| | Stress Test 1 | | Stress Test 2 | |
| | Median | Range | Median | Range |
| A | 521.8 | 340-561.4 | | |
| B | 85.7 | 19-537 | 84.6 | 50-338 |
| C | 8.4 | 0.2-17 | 60.6 | 7.2-305 |
| D | 3.2 | 0.8-23.4 | 5.6 | 0.4-171 |

The above data shows that the time and temperature treatment of the disc is quite sensitive, and the improvement obtained is not merely a linear function of time; that is, improved results were obtained at one minute treatment over a two minute treatment at 130° F. Evidently the surface character of the disc changes rapidly with exposure to hot water and the optimum time for each temperature should be determined by a series of test runs in order to optimize the treatment so as to obtain improved results as far as disc surface stability is concerned.

We claim:

1. In the manufacture of a conductive high density information disc having video and audio information in the form of geometric variations in an information track which can be reconstituted in electrical signal form with a playback stylus, wherein a conductive plastic material is compression molded to form said disc, and said disc is cleaned with an aqueous solution to remove water soluble salts from the surface of said disc, the improvement which comprises treating said disc with an additional high temperature aqueous wash at a temperature of from about 110° to 130° F. for a period of time so as to improve the stability of the surface of the disc with respect to elevated temperature and high relative humidity.

2. A process according to claim 1 wherein said high temperature wash is performed after an initial cleaning step with said aqueous solution.

3. A process according to claim 1 wherein said high temperature wash is performed at a temperature of about 130° F.

4. The process according to claim 1 wherein said high temperature wash is followed by an aqueous rinse at a temperature of at least about 110° F. up to about 130° F.

5. A process according to claim 1 wherein said high temperature wash is followed by an aqueous rinse step and a perfluorocarbon drying step.

6. A process according to claim 5 wherein said drying step is followed by a lubrication step.

7. A process according to claim 6 wherein said lubricant has the formula

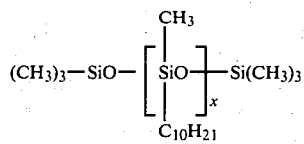

wherein R is an alkyl group of 4-20 carbon atoms and x is an integer.

8. A process according to claim 1 or 5 wherein said aqueous cleaning solution contains organic alcohols.

9. A process according to claim 8 wherein said aqueous cleaning solution contains

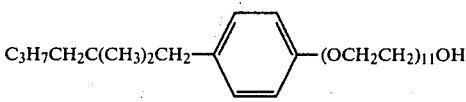

10. In a method of fabricating a video disc replica which comprises dry blending a polyvinylchloride resin with additives including stabilizers, lubricants and flow modifiers, molding to form a video disc replica, cleaning the disc replica with a water based solution to remove water soluble salts from the surface of the disc and applying a thin lubricant layer to the disc surface, the improvement which comprises treating said disc with an additional high temperature aqueous wash at a temperature of from about 110° to 130° F. for a period of time prior to applying the lubricant so as to improve the stability of the surface of the disc with respect to elevated temperature and high relative humidity.

11. A method according to claim 10 wherein the additives include at least 12 percent by weight of the molding composition of conductive carbon black particles.

12. A method according to claim 10 wherein the lubricant consists essentially of a siloxane of the formula $$(CH_3)_3-SiO-\left[\begin{array}{c}CH_3\\|\\SiO\\|\\C_{10}H_{21}\end{array}\right]_x Si(CH_3)_3$$

wherein x is about 2 to 3.

13. A method according to claim 10 wherein said high temperature wash is followed by an aqueous rinse at a temperature of at least about 110° F. up to about 130° F.

14. A method according to claim 10 wherein said high temperature wash is followed by an aqueous rinse step and a perfluorocarbon drying step.

15. A method according to claim 10 wherein the water based solution is a solution of organic alcohols.

16. A method according to claim 15 wherein said water based solution contains

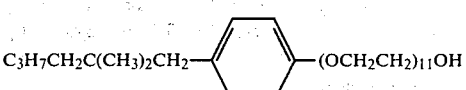

* * * * *